United States Patent
Shaver et al.

(10) Patent No.: US 9,112,654 B2
(45) Date of Patent: Aug. 18, 2015

(54) WIRELESS COMMUNICATIONS DEVICE WITH MULTIPLE TRELLIS DECODERS AND RELATED METHODS

(75) Inventors: Joseph B. Shaver, Rochester, NY (US); John Wesley Nieto, Rochester, NY (US); Michael Patrick Snook, Walworth, NY (US)

(73) Assignee: HARRIS CORPORATION, Melbourne, FL (US)

( * ) Notice: Subject to any disclaimer, the term of this patent is extended or adjusted under 35 U.S.C. 154(b) by 1012 days.

(21) Appl. No.: 13/210,600

(22) Filed: Aug. 16, 2011

(65) Prior Publication Data

US 2013/0044655 A1    Feb. 21, 2013

(51) Int. Cl.
*H03M 13/25* (2006.01)
*H04L 1/00* (2006.01)
*H03M 13/53* (2006.01)

(52) U.S. Cl.
CPC ............ *H04L 1/0043* (2013.01); *H04L 1/0054* (2013.01); *H04L 1/005* (2013.01)

(58) Field of Classification Search
CPC ..... H04L 1/0043; H04L 1/0054; H04L 1/005; H04L 1/0059; H03M 13/256; H03M 13/41; H03M 13/2957
See application file for complete search history.

(56) References Cited

U.S. PATENT DOCUMENTS

| | | | |
|---|---|---|---|
| 6,556,617 B1 * | 4/2003 | Tsujimoto | 375/141 |
| 7,020,827 B2 | 3/2006 | Gatherer et al. | 714/786 |
| 7,072,414 B1 * | 7/2006 | Lui et al. | 375/274 |
| 7,107,509 B2 | 9/2006 | Bickerstaff et al. | 714/780 |
| 7,657,825 B2 | 2/2010 | Norris et al. | 714/792 |
| 7,721,187 B2 | 5/2010 | Yen | 714/794 |
| 8,767,882 B2 | 7/2014 | Shaver et al. | |
| 2002/0168017 A1 * | 11/2002 | Berthet et al. | 375/267 |
| 2003/0152050 A1 * | 8/2003 | Mochizuki | 370/332 |
| 2007/0011595 A1 * | 1/2007 | Cameron et al. | 714/796 |
| 2007/0266303 A1 | 11/2007 | Shih | 714/795 |
| 2009/0135946 A1 | 5/2009 | Dowling et al. | 375/286 |
| 2011/0305270 A1 * | 12/2011 | Stojanovic et al. | 375/232 |

* cited by examiner

*Primary Examiner* — April Y Blair
*Assistant Examiner* — Dipakkumar Gandhi
(74) *Attorney, Agent, or Firm* — Allen, Dyer, Doppelt, Milbrath & Gilchrist, P.A.

(57) ABSTRACT

A wireless communications device includes a receiver, and a decoder coupled downstream from the receiver. The decoder is configured to alternatively decode a first signal using a first trellis state transition map including first valid transitions, the first signal having a first modulation order, and second signals using second trellis state transition maps including respective second valid transitions defined from the first valid transitions. The second signals have respective modulation orders less than the first modulation order.

18 Claims, 3 Drawing Sheets

WIRELESS COMMUNICATIONS DEVICE WITH MULTIPLE TRELLIS DECODERS AND RELATED METHODS

FIELD OF THE INVENTION

The present invention relates to the field of mobile wireless communications devices, and, more particularly, to mobile wireless communications devices using modulations having memory and related methods.

BACKGROUND OF THE INVENTION

Mobile communications devices have become an integral part of society over the last two decades. Indeed, more than eighty-two percent of Americans own a mobile communications device, for example, a cell phone. The typical mobile communications device includes an antenna, and a transceiver coupled to the antenna. The transceiver and the antenna cooperate to transmit and receive communications signals.

Before transmission, the typical mobile communications device modulates digital data onto an analog signal. As will be readily appreciated by the skilled person, there is a plurality of modulations available for most applications. Some particularly advantageous modulations include, for example, continuous phase modulation (CPM). The constant envelope characteristics of this modulation provide for lower energy demands on the power amplifier of mobile communications devices, for example, by reducing the peak-to-average power ratio (PAPR), increasing average transmit power (providing greater transmission range), and increasing amplifier efficiency, i.e. allowing the use of non-linear amplifiers such as Class C amplifiers. Moreover, CPM provides for efficient use of available bandwidth.

A potential drawback of CPM modulations is the use of the inherent memory of the modulation when demodulating/decoding the waveform in order to obtain good demodulator performance. When the mobile communications device receives a transmitted signal which uses a modulation with memory, the decoder uses not only the current signal portion to demodulate but in addition uses information from previous signal portions, i.e. memory, to demodulate the current signal. In other words, the phase of the transmitted signal is dependent on previous signaling intervals.

Decoding modulations with memory increases the computational and memory demands on the transceiver, i.e. a maximum likelihood sequence estimator (MLSE) or the Bahl-Cocke-Jelinek-Raviv (BCJR) algorithm is typically used to demodulate modulations with memory, thereby increasing the complexity of the device, which may be undesirable in a limited power compact mobile device. More so, when the received signal has a multipath component to it, the size of the MLSE or BCJR trellis structure used to demodulate the signal grows exponentially, which may make practical implementation in a mobile communications device difficult since computational resources are limited.

In typical mobile communications devices that use multiple different bandwidth efficient modulations, such as various CPM waveforms (concatenated with convolutional forward error correction (FEC) codes), the demodulation and multipath MLSE or BCJR trellis may require a large amount of computational resources to implement the decoders for all possible combinations of modulation and FEC or yield very slow programmable decoders which can be used for all waveforms. In particular, the trellis structure maps may become large and onerous in computational overhead. One approach is to reuse trellis elements for different applications, for example, as disclosed in U.S. Pat. No. 7,020,827 to Gatherer et al., which discloses reusing state metrics to provide multiple trellis structures coupled in cascade.

Another approach is to reuse elements of one trellis structure (intended for one modulation) for another trellis structure (intended for another different modulation). This approach typically uses multiplexers to route and reroute inputs and outputs throughout the trellis structure. A drawback to this approach is the multiplexers may also consume a large amount of computational resources and add to decoder complexity.

SUMMARY OF THE INVENTION

In view of the foregoing background, it is therefore an object of the present invention to provide a wireless communications device that is efficient and fast.

This and other objects, features, and advantages in accordance with the present invention are provided by the following wireless communications device. This wireless communications device includes a receiver, and a decoder coupled downstream from the receiver and configured to alternatively decode a first signal using a first trellis state transition map comprising first valid transitions, the first signal having a first modulation order, and a plurality of second signals using a plurality of second trellis state transition maps comprising a plurality of respective second valid transitions defined from the first valid transitions, the plurality of second signals having respective modulation orders less than the first modulation order. Advantageously, the decoder efficiently reuses the first valid transitions from the first trellis state transition map for the second valid transitions in the second trellis state transition maps.

In some embodiments, the decoder may be configured to decode the plurality of second signals in parallel. In particular, the first trellis state transition map may have a plurality of first branch metric waveform lookup tables associated therewith, and the decoder may be configured to reduce the first valid transitions to the plurality of second valid transitions by at least modifying the first branch metric waveform lookup tables.

Additionally, the wireless communications device may further comprise a multiplexer coupled to the decoder and configured to multiplex the first signal and the plurality of second signals. The decoder may comprise an iterative decoder, and the multiplexer may be configured to further multiplex extrinsic decoder data.

The first signal may have a first modulation parameter, and each of the plurality of second signals may have a respective second modulation parameter different than the one first modulation parameter, thereby permitting waveform flexibility. The wireless communications device may also comprise an antenna coupled to the receiver.

For example, the decoder may be based upon a field-programmable gate array (FPGA) chip. The first signal may comprise a 4-ary CPM signal, and the plurality of second signals may comprise 2-ary CPM signals.

Another aspect is directed to a method of operating a wireless communications device. The method comprises using a decoder in the wireless communications device to alternatively decode a first signal using a first trellis state transition map comprising first valid transitions, the first signal having a first modulation order. Also, the method comprises using the decoder in the wireless communications device to alternatively decode a plurality of second signals using a plurality of second trellis state transition maps comprising a plurality of respective second valid transitions defined from the first valid transitions, the plurality of second signals having respective modulation orders less than the first modulation order.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
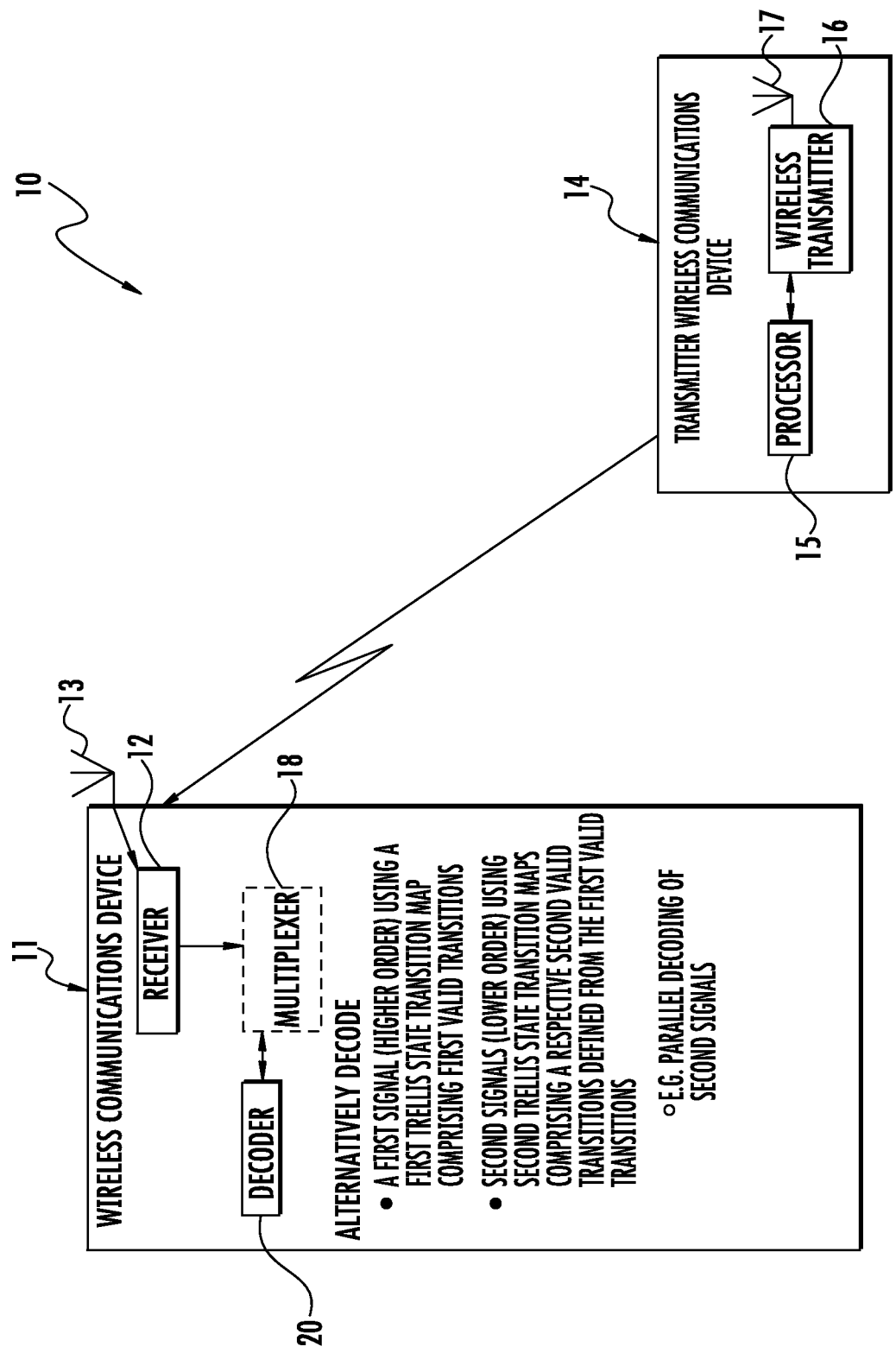
FIG. 1 is a schematic diagram of a wireless communication system, according to the present invention.
Figure 2:
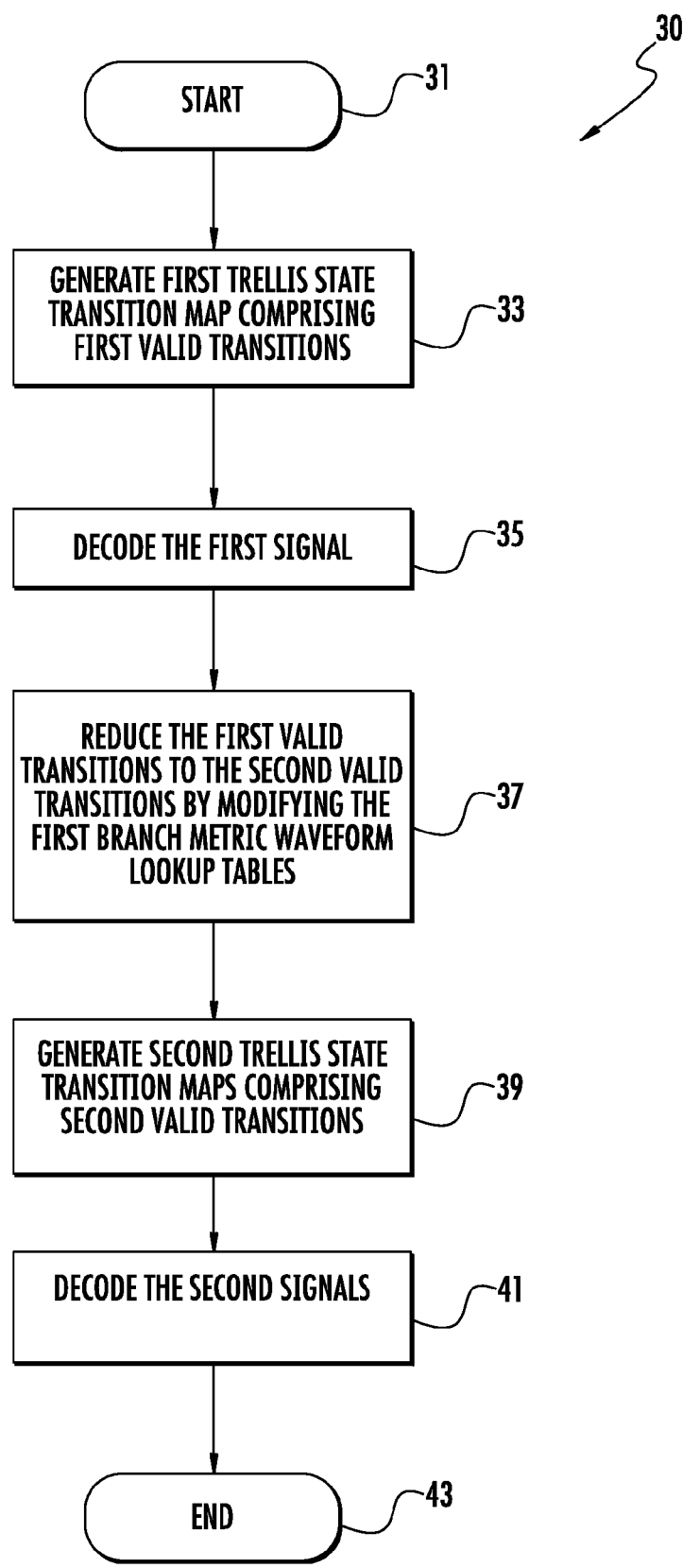
FIG. 2 is a flowchart illustrating operation of the receiver wireless communications device of FIG. 1.

Referring initially to FIGS. 1-2, a wireless communication system 10 according to the present invention is now described. The wireless communications system 10 illustratively includes a receiver wireless communications device 11, and a transmitter wireless communications device 14 communicating therewith. Furthermore, a flowchart 30 illustrates a method of operation of the receiver wireless communications device 11, which begins at Block 31. The receiver wireless communications device 11 illustratively includes an antenna 13, a receiver 12 coupled to the antenna, a multiplexer 18 coupled downstream from the receiver, and a decoder 20 coupled downstream from the multiplexer. In the illustrated embodiment, the receiver wireless communications device 11 includes the multiplexer 18 (shown with shadowed lines) for multiplexing inputs to the decoder, but it should be understood that this component is optional and may be excluded in other embodiments.

The transmitter wireless communications device 14 illustratively includes an antenna 17, a transmitter 16 coupled to the antenna, and a processor 15 coupled to the transmitter. As will be appreciated by those skilled in the art, the wireless communications devices 11, 14 may include a plurality of differing types of wireless communications devices modified according to the teachings herein, for example, the Falcon® III/117G manpack radio, or SBR/SPR handheld radio, as available from the Harris Corporation of Melbourne, Fla., the assignee of the present application. Moreover, as will be appreciated by those skilled in the art, although the wireless communications devices 11, 14 are depicted as one-way communications device, i.e. a transmitter and companion receiver (simplex communications), they may each comprise transceivers for typical duplex communications.

As illustrated, the transmitter wireless communications device 14 transmits a modulated signal to the receiver wireless communications device 11. In one particularly advantageous embodiment, the wireless communication system 10 may use a bandwidth efficient modulation, for example, a CPM waveform concatenated with a convolutional FEC code. As will be appreciated by those skilled in the art, these aforementioned modulations include memory, and the decoder 20 may implement a MLSE or BCJR trellis decoder to demodulate the received signal. For example, the decoder 20 may implement the trellis decoder disclosed in U.S. Pat. No. 7,657,825 to Norris et al., also assigned to the present application's assignee and incorporated herein by reference in its entirety. Of course, in the wireless communication system 10, multiple modulations may be used.

The decoder 20, the multiplexer 18, and the receiver 12 may be based upon one or more of a FPGA chip, a digital signal processing integrated circuit (DSP IC) chip, etc. Also, the decoder 20 may implement one or more of the following algorithms, a Viterbi decoding algorithm, the BCJR algorithm, a MAP algorithm, a LOG-MAP algorithm, a MAX-LOG-MAP algorithm, etc. Nevertheless, as will be appreciated by those skilled in the art, in the typical communications device, there are finite computational resources available to implement a trellis decoder, thereby making implementing multiple separate trellis decoders quite onerous.

Figure 3:
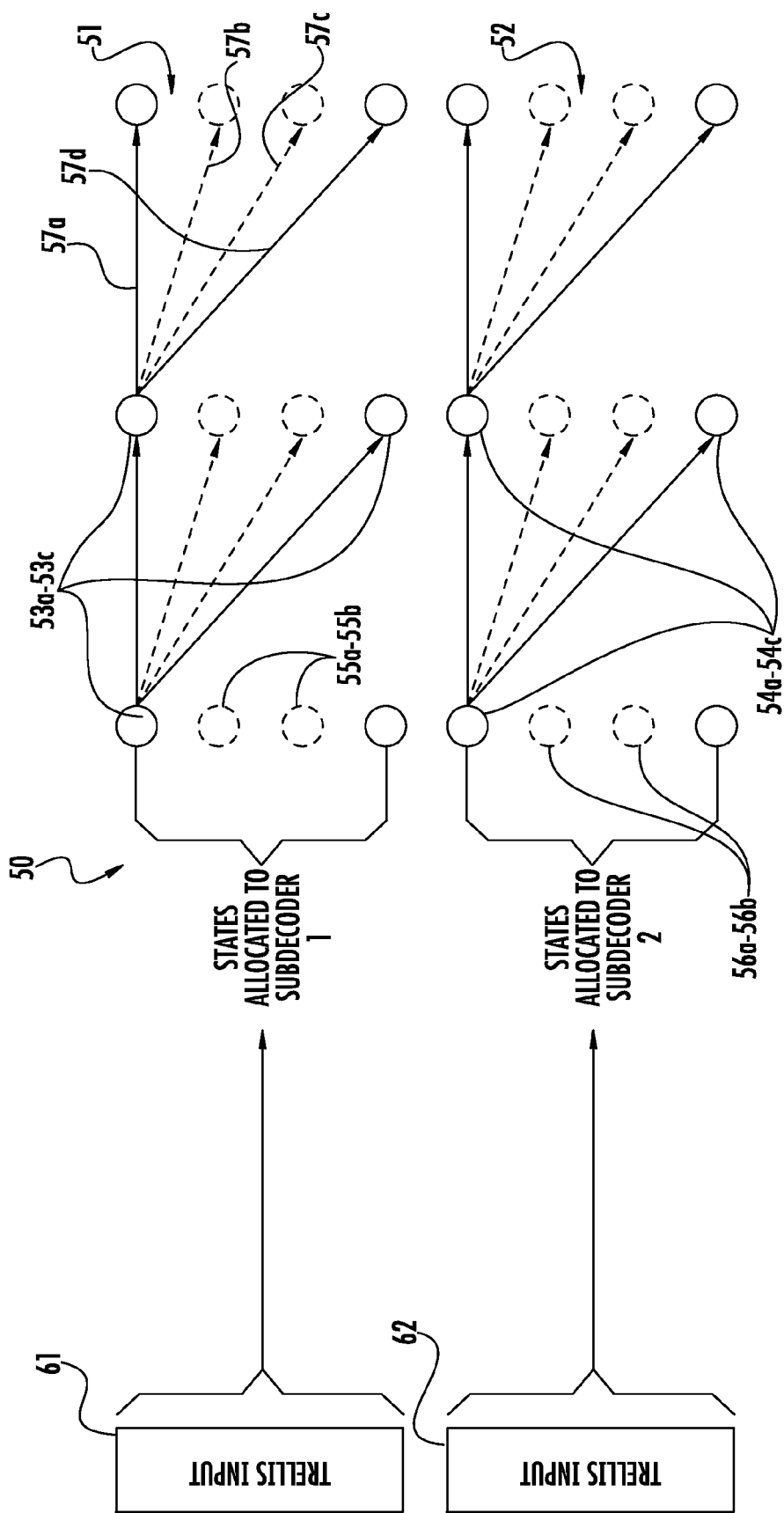
FIG. 3 is a schematic diagram of the second valid transitions being defined from the first valid transitions in the receiver wireless communications device of FIG. 1.

Referring now additional to FIG. 3, the decoder 20 generates a first trellis state transition map 50 for a first modulation (Block 33) (i.e. CPM_4, discussed herein). The decoder 20 is configured to decode a first signal (using the first modulation) using the first trellis state transition map 50 comprising first valid transitions 57a-57d (Block 35). The first signal has a first modulation order. Using the first trellis state transition map 50, the decoder 20 constrains valid transitions to represent one or more lower order modulations (one or more second modulations, such as CPM_1, CPM_2, or CPM_3, discussed herein) (Block 37). In particular, the decoder 20 assigns groups of states 53a-53c, 54a-54c from the first trellis state transition map 50 to represent one or more lower order decoders for one or more second modulations (e.g. the 3 groups for CPM_1 in first example). The decoder 20 performs this reassignment on states from the first trellis state transition map 50 by at least modifying a plurality of first branch metric waveform lookup tables associated with the first trellis state transition map (Block 39).

In other words, the decoder 20 is configured to alternatively decode a plurality of second signals using a plurality of second trellis state transition maps 51-52 comprising a plurality of respective second valid transitions 57a, 57d defined from the first valid transitions (Blocks 41, 43). To this point, as depicted in FIG. 3, some transitions 57b, 57c and states 55a-56b from the first trellis state transition map 50 will not be valid in the second trellis state transition maps 51-52, i.e. these transitions and states will be removed for decoding the second signals. The second trellis state transition maps 51-52 illustratively receive corresponding inputs 61-62, which may comprise at least one of receive samples, extrinsic data (iterative embodiments), and waveform lookup tables.

As noted above, the second signals are modulated with less complex waveforms and have respective modulation orders less than the first modulation order. In one advantageous embodiment, the first signal may comprise a 4-ary CPM signal, and the plurality of second signals may comprise 2-ary CPM signals.

In some embodiments, the decoder 20 may be configured to decode the plurality of second signals in parallel and near simultaneously. Additionally, the multiplexer 18 is configured to multiplex the first signal and the plurality of second signals to appropriate inputs of the decoder. More so, in embodiments where the decoder 20 comprises an iterative decoder, the multiplexer 18 may be configured to further multiplex extrinsic decoder data. Quite differently from the typical wireless communications device, the disclosed receiver wireless communications device 11 only needs to multiplex inputs and outputs rather than the entire trellis state transition map, thereby reducing the complexity of the implemented trellis structures.

Advantageously, the decoder 20 may effectively decode signals using the first modulation and each of the second modulations using the trellis states 53a-53c, 55a-56b of the first trellis state transition map 50. This provides for a significant reduction is resource consumption over the typical wireless communication device, which may need to implement separate trellis decoders for each potential modulation.

Moreover, in some embodiments, the plurality of second signals may be part of the same receive burst. In other embodiments, the plurality of second signals may comprise parallel independent bursts received through some kind of diversity, for example, time, space, frequency, etc.

In particular, the first and second modulations may each allow for different receiver estimation parameters. In other words, the first signal may have at least one first modulation parameter, and each of the plurality of second signals may have a respective at least one second modulation parameter different than the at least one first modulation parameter, thereby permitting the receiver wireless communications device 11 flexibility to implement different modulations without the typical commensurate computational overhead. For example, the modulation parameters may comprise one or more of a channel estimate, phase and frequency tracking parameters, waveform phase and envelope shape, etc.

Although not depicted in the accompanying drawings, the receiver wireless communications device 11 may also include a soft decisions module downstream from the decoder 20 for making decoding decisions for the receive first and second signals. In particular, the soft decisions module would be configured to receive the output from each of the second trellis state transition maps 51-52 and the first trellis state transition map 50 and to make decoding soft decisions for each. Also, the receiver wireless communications device 11 may also comprise another multiplexer between the decoder 20 and the soft decisions module for routing the outputs of the appropriate trellis state transition maps 50-52 thereto.

As will be appreciated by those skilled in the art, to better describe the invention, an exemplary discussion of the operation of one embodiment of the decoder 20 is now described. First, it is assumed that 4 different CPM waveforms are required by a demodulator and that there is limited space available for use by this demodulator in an FPGA. The 4 CPM waveforms are: h=½, 1REC, binary (CPM_1); h=¼, 1REC, binary (CPM_2); h=⅙, 1REC, binary (CPM_3); and h=⅙, 1REC, quaternary (CPM_4). Where h is the modulation index, and 1REC means that the CPM frequency pulse is rectangular and spans 1 symbol.

The state mappings are provided below and show the starting state followed by the next state and data required to get to that state.

| CPM_1 (h = ½, 1REC, M_ary = 2) | |
|---|---|
| State 0: | (3, −1) (1, 1) |
| State 1: | (0, −1) (2, 1) |
| State 2: | (1, −1) (3, 1) |
| State 3: | (2, −1) (0, 1) |
| CPM_2 (h = ¼, 1REC, M_ary = 2) | |
| State 0: | (7, −1) (1, 1) |
| State 1: | (0, −1) (2, 1) |
| State 2: | (1, −1) (3, 1) |
| State 3: | (2, −1) (4, 1) |
| State 4: | (3, −1) (5, 1) |
| State 5: | (4, −1) (6, 1) |
| State 6: | (5, −1) (7, 1) |
| State 7: | (6, −1) (0, 1) |
| CPM_3 (h = ⅙, 1REC, M_ary = 2) | |
| State 0: | (11, −1) (1, 1) |
| State 1: | (0, −1) (2, 1) |
| State 2: | (1, −1) (3, 1) |
| State 3: | (2, −1) (4, 1) |
| State 4: | (3, −1) (5, 1) |
| State 5: | (4, −1) (6, 1) |
| State 6: | (5, −1) (7, 1) |
| State 7: | (6, −1) (8, 1) |
| State 8: | (7, −1) (9, 1) |
| State 9: | (8, −1) (10, 1) |
| State 10: | (9, −1) (11, 1) |
| State 11: | (10, −1) (0, 1) |
| CPM_4 (h = ⅙, 1REC, M_ary = 4) | |
| State 0: | (3, 3) (1, 1) (11, −1) (9, −3) |
| State 1: | (4, 3) (2, 1) (0, −1) (10, −3) |
| State 2: | (5, 3) (3, 1) (1, −1) (11, −3) |
| State 3: | (6, 3) (4, 1) (2, −1) (0, −3) |
| State 4: | (7, 3) (5, 1) (3, −1) (1, −3) |
| State 5: | (8, 3) (6, 1) (4, −1) (2, −3) |
| State 6: | (9, 3) (7, 1) (5, −1) (3, −3) |
| State 7: | (10, 3) (8, 1) (6, −1) (4, −3) |
| State 8: | (11, 3) (9, 1) (7, −1) (5, −3) |
| State 9: | (0, 3) (10, 1) (8, −1) (6, −3) |
| State 10: | (1, 3) (11, 1) (9, −1) (7, −3) |
| State 11: | (2, 3) (0, 1) (10, −1) (8, −3) |

This decoder 20 would implement the CPM_4 trellis connectivity in the FPGA. The data symbols would be re-ordered to perform add/compare/select functions on −3,3, −1,1. This re-ordering allows some of the binary cases to work by simply performing the first add/compare/select and stopping.

The CPM_4 trellis would allow 3 parallel trellises for CPM_1: first is [0,3,6,9]; second is [1,4,7,10]; and third is [2,5,8,11], where data symbols used would be for the −3 and 3 data symbols. The CPM_4 trellis would allow 1 trellis for CPM_2 using states 0 to 7 and 11. Results for states 8 and 10 would be ignored (or branch metrics modified such that states 8 and 10 are essentially ignored).

The CPM_4 trellis would allow 1 trellis for CPM_3, where branch metrics for data −3 and 3 are computed using −1 and 1, and only the first Add/Compare/Select is performed. It is noted that all manipulations required for demodulators to work properly are achieved by remapping the indexes and data bits used in the metric computations block and do not affect the trellis for CPM_4 and its connectivity. In addition, the metric computation block can also set some metrics values, which causes them to be to ignored based on which CPM waveform is being demodulated. Thus, no multiplexing is required in the FPGA for managing the trellis for demodulating all 4 CPM waveforms, only one trellis structure is used for all.

Other features relating to wireless communications devices are disclosed in co-pending application "MOBILE WIRELESS COMMUNICATIONS DEVICE AND RECEIVER WITH DEMODULATION AND RELATED METHODS," application Ser. No. 12/884,846, which is incorporated herein by reference in its entirety.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless communications device comprising:
a receiver; and
a decoder coupled downstream from said receiver and configured to alternatively decode
a first signal using a first trellis state transition map comprising first valid transitions, the first signal having a first modulation order, and
a plurality of second signals using a plurality of second trellis state transition maps comprising a plurality of respective second valid transitions defined from the first valid transitions, the plurality of second signals having respective modulation orders less than the first modulation order.

2. The wireless communications device of claim 1 wherein said decoder is configured to decode the plurality of second signals in parallel.

3. The wireless communications device of claim 1 wherein the first trellis state transition map has a plurality of first branch metric waveform lookup tables associated therewith; and wherein said decoder is configured to reduce the first valid transitions to the plurality of second valid transitions by at least modifying the plurality of first branch metric waveform lookup tables.

4. The wireless communications device of claim 1 further comprising a multiplexer coupled to said decoder and configured to multiplex the first signal and the plurality of second signals.

5. The wireless communications device of claim 4 wherein said decoder comprises an iterative decoder; and wherein said multiplexer is configured to further multiplex extrinsic decoder data.

6. The wireless communications device of claim 1 wherein the first signal has a first modulation parameter; and wherein each of the plurality of second signals has a respective second modulation parameter different than the first modulation parameter.

7. The wireless communications device of claim 1 wherein the first signal comprises a 4-ary continuous phase modulation (CPM) signal; and wherein the plurality of second signals comprises 2-ary CPM signals.

8. A wireless communications device comprising:
a receiver;
an antenna coupled to said receiver; and
a decoder coupled downstream from said receiver and configured to alternatively
decode a first signal using a first trellis state transition map comprising first valid transitions, the first signal having a first modulation order, and
decode a plurality of second signals in parallel using a plurality of second trellis state transition maps comprising a plurality of respective second valid transitions defined from the first valid transitions, the plurality of second signals having respective modulation orders less than the first modulation order.

9. The wireless communications device of claim 8 wherein the first trellis state transition map has a plurality of first branch metric waveform lookup tables associated therewith; and wherein said decoder is configured to reduce the first valid transitions to the plurality of second valid transitions by modifying the plurality of first branch metric waveform lookup tables.

10. The wireless communications device of claim 8 further comprising a multiplexer coupled to said decoder and configured to multiplex the first signal and the plurality of second signals.

11. The wireless communications device of claim 10 wherein said decoder comprises an iterative decoder; and wherein said multiplexer is configured to further multiplex extrinsic decoder data.

12. The wireless communications device of claim 8 wherein the first signal has a first modulation parameter; and wherein each of the plurality of second signals has a respective second modulation parameter different than the first modulation parameter.

13. A method of operating a wireless communications device comprising:
using a decoder in the wireless communications device for alternatively:
decoding a first signal using a first trellis state transition map comprising first valid transitions, the first signal having a first modulation order; and
decoding a plurality of second signals using a plurality of second trellis state transition maps comprising a plurality of respective second valid transitions defined from the first valid transitions, the plurality of second signals having respective modulation orders less than the first modulation order.

14. The method of claim 13 further comprising decoding the plurality of second signals in parallel.

15. The method of claim 13 wherein the first trellis state transition map has a plurality of first branch metric waveform lookup tables associated therewith; and further comprising reducing the first valid transitions to the plurality of second valid transitions by modifying the first branch metric waveform lookup tables.

16. The method of claim 13 further comprising multiplexing the first signal and the plurality of second signals using a multiplexer.

17. The method of claim 16 further comprising iteratively decoding the first and second signals and using the multiplexer to further multiplex extrinsic decoder data.

18. The method of claim 13 wherein the first signal has a first modulation parameter; and wherein each of the plurality of second signals has a respective second modulation parameter different than the first modulation parameter.

* * * * *